M. S. HOPKINS & C. R. BARNETT.
PROCESS FOR RECOVERY OF INGREDIENTS OF OILY INK.
APPLICATION FILED JULY 21, 1908.
932,548.
Patented Aug. 31, 1909.
2 SHEETS—SHEET 1.
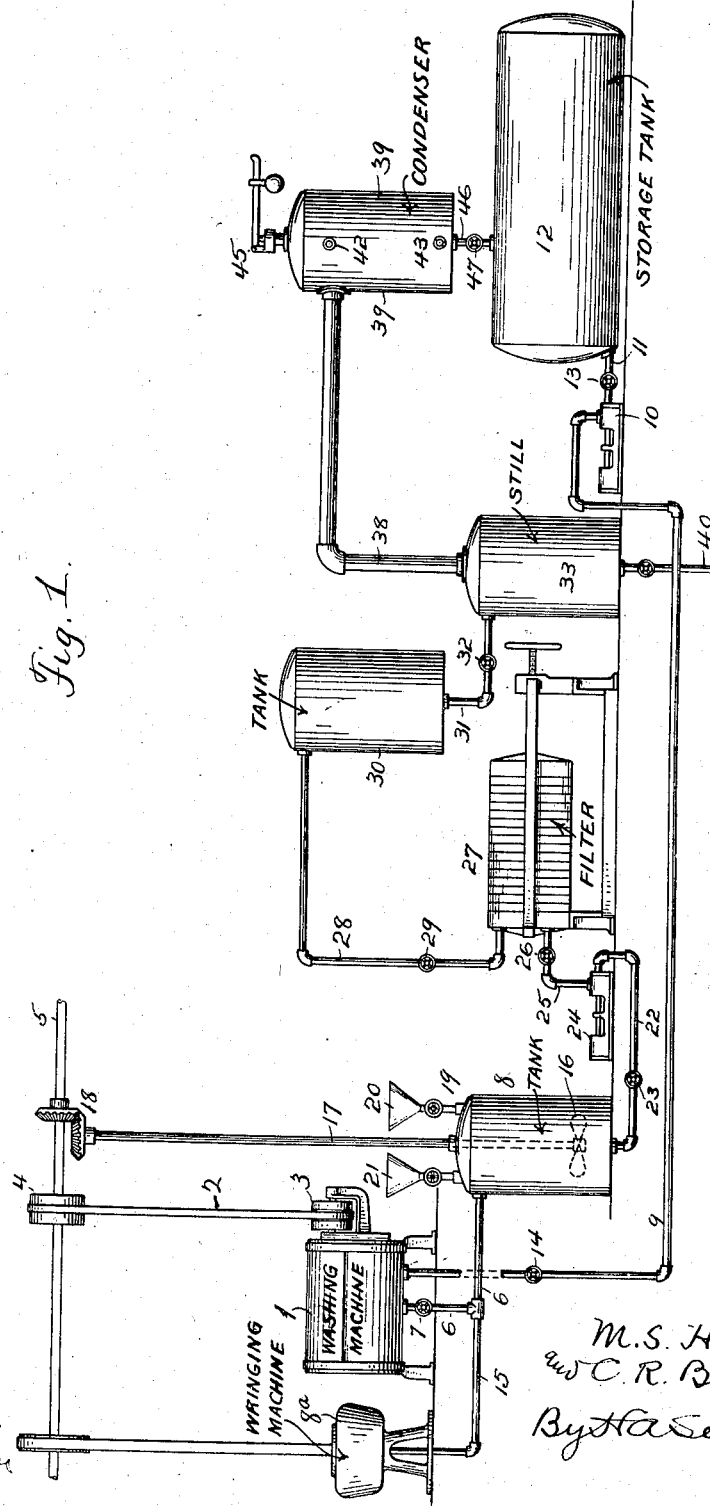

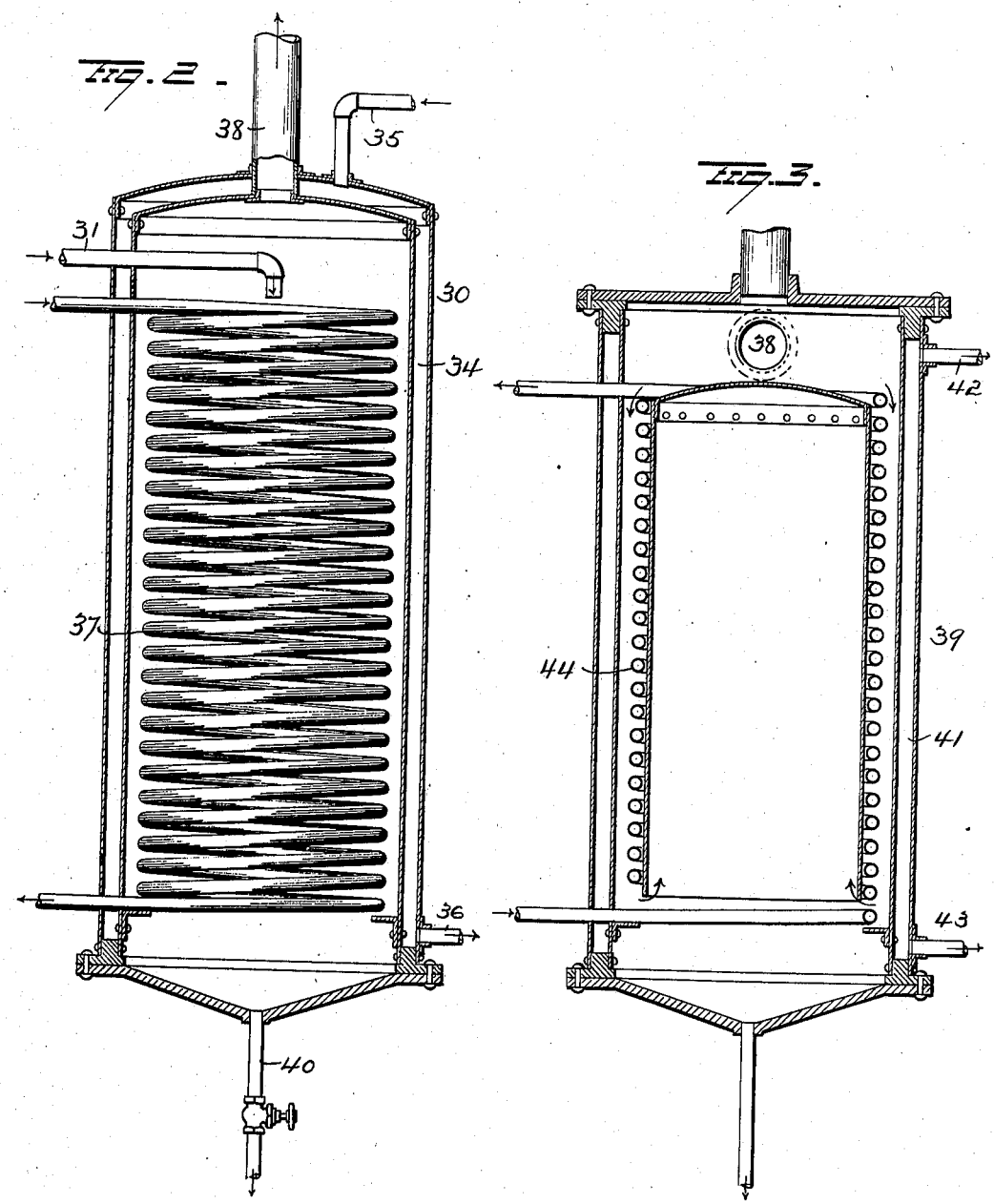

UNITED STATES PATENT OFFICE.

MATTHEW S. HOPKINS AND CHARLES RIDGELY BARNETT, OF ROLAND PARK, MARYLAND.

PROCESS FOR RECOVERY OF INGREDIENTS OF OILY INK.

932,548. Specification of Letters Patent. Patented Aug. 31, 1909.

Application filed July 21, 1908. Serial No. 444,617.

*To all whom it may concern:*

Be it known that we, MATTHEW S. HOPKINS and CHARLES R. BARNETT, of Roland Park, in the State of Maryland, have invented certain new and useful Improvements in Processes for the Recovery of Ingredients of Oily Ink; and we do hereby declare the following to be a full, clear, and exact description of the invention, such as will enable others skilled in the art to which it appertains to make and use the same.

This invention relates to the recovery of the component ingredients of oily ink, such for example, as that contained in the cloths used for wiping engraving plates,—one object of the invention being to so treat the liquor resulting from the washing of ink-ladened cloths, that the pigment can be subsequently separated mechanically from the oil and from the solvent employed in washing the cloths.

A further object is to so treat a liquor containing oily ink and solvent, as to separate the pigment from the solvent and oil, and separately recover the solvent, the oil and the pigment.

With these objects in view, the invention consists in certain novel steps in the process of recovering the component ingredients of oily ink and also the solvent employed in the process, as hereinafter set forth and pointed out in the claims.

In the accompanying drawings; Figure 1 is a view illustrating one construction of apparatus with the use of which our improved process can be carried into effect. Fig. 2 is a sectional view of the still; and Fig. 3 is a sectional view of the condenser.

For the purpose of removing ink from cloths used for wiping engraving plates, it has heretofore been proposed to wash the cloths in a solvent, such as naphtha, so that the resulting liquor will consist of naphtha carrying in solution or suspension, the pigment and oil of which the ink was composed. The constituents of this liquor are valuable when properly separated and recovered, but heretofore, difficulty has been experienced in filtering the pigment from the oil, and as the latter is the most valuable ingredient of the liquor, it is highly desirable to effectually separate all of the pigment therefrom. Experience has demonstrated that if the liquor be passed (without previous chemical treatment) through a filter press, the latter will fail to effectually separate the pigment from the oil, and it is therefore important to so treat the liquor as to destroy the viscous quality of the oil and form a precipitate capable of carrying down the pigment, which can then be fully separated from the oil and solvent with the use of a filter press or other means for effecting mechanical separation.

In carrying our process into effect, we place the cloths or other material containing ink or other greasy pigment, in a washing machine 1, and agitate them in the presence of a suitable solvent, such, for example, as benzin, ethers, esters, carbon tetra-chlorid, chloroform, carbon bi-sulfid, naphtha, turpentine or other oil solvent. The washing machine may be driven by a belt 2 passing over a pulley 3 on the driven shaft of the machine, and receiving motion from a pulley 4 on a line shaft 5, the latter being driven from any suitable source of power.

After the cloths have been treated for ten minutes (more or less) with benzin or other solvent in the washing machine, the resulting liquor will be discharged through a pipe 6 (having a controlling valve 7) to a tank or vat 8. A pipe 9 also communicates at one end with the washing machine 1 and at its other end with a pump 10, the latter communicating by a pipe 11, with a solvent storage tank 12. A valve 13 is provided in the pipe 11 and a similar valve 14 is provided in the pipe 9 for controlling the passage of solvent to the washing machine.

After the cloths have been treated and the liquor (consisting of solvent, pigment and oil) has been run into the tank or vat 8 as above described, the valve 7 will be closed and the valves 13—14 opened. The pump 10 may now be operated to force more solvent into the washing machine for the further treatment of the cloths therein, after which the liquor will be run into the tank or vat 8, as before. These operations will be continued until the cloths shall have been fully cleansed of the oily ink. The cloths may then be removed from the washing machine and placed in a centrifugal extractor or wringing machine 8ª of any suitable construction, and any remaining solution removed from them; such solution being conducted by a pipe 15 to the pipe 6 and thence to the tank or vat 8. An agitator 16 is located within the tank 8 and the shaft 17 of this agitator may be driven from the line shaft 5, through the medium of suitable gearing 18. The cover 19 of the tank 8 may rest loosely thereon and is provided with funnels 20—21 to permit the introduction of chemicals into said tank.

While the liquor in the tank is undergoing agitation, we treat the same with a substance or reagent, such as clay, infusorial earth, carbon, precipitated solids, or alcoholic or etherial solutions of all reagents capable of entering into combination with a second substance which is introduced in such a way as to form a precipitate, the nature of which will render the insoluble matter capable of mechanical separation from the oil and solvent.

We have found that an alcoholic solution of calcium chlorid in substantially the proportions of one part of calcium chlorid to two parts of alcohol by weight, or lead acetate will serve efficiently for the reagent first introduced into the tank 8 with the liquor, and that the substance subsequently introduced during agitation of the material and which will cause a precipitate containing the pigment in the liquor that can be mechanically filtered or separated from the liquor and solvent, may be a chemically equivalent amount of solution of sulfuric acid and alcohol in substantially the proportions of one part of sulfuric to one part of alcohol. Good results can be obtained by introducing two pounds of the combined alcoholic solutions to seventy pounds of liquor, in the proportions of thirty-six parts of alcoholic solution of calcium chlorid to seventeen parts of alcoholic solution of sulfuric acid. The liquor contained in the tank 8 will be thoroughly agitated with the reagents above referred to until the precipitate is such as can be filtered through an ordinary filter press, or which can be separated from the fluid by any other mechanical means.

The failure of liquor to properly filter to remove the pigment, without being first treated as above described, is believed to be due, not so much to the nature of the pigment as it is to the viscous character of the carrier, and we have discovered that with the use of materials such as ethers, esters, solvent naphtha, alcoholic solutions of soap, etc., such viscous property of the liquor is destroyed and thus mechanical separation of the carrier and pigment is rendered possible.

The tank or vat 8 is connected by means of a pipe 22 (having a valve 23) with a pump 24, and the latter is connected by a pipe 25 having a valve 26, with a filter press 27.

When the liquor in the tank 8 has been treated as before explained, the valves 23 and 26 will be opened and the pump 24 operated to cause the liquor containing the precipitate to flow to and through the filter press 27. The now insoluble precipitate consisting very largely of pigment will be arrested by the filter press, while the fluid will leave the filter press by a pipe 28 (having a valve 29) and enter a tank 30. The solution containing heavy oil and solvent now in the tank 30, is allowed to flow through a pipe 31 (having a valve 32) to a still 33. This still is made with a steam jacket 34 with which steam pipes 35—36 communicate, and said still may also contain a steam coil 37 for heating the same, or the still may be heated in any other desired manner. The solvent contained in the fluid entering the still will be vaporized and the vapor permitted to escape through a pipe 38 and enter a condenser 39, while the heavy oil remaining in the still can be drawn off through a valved pipe 40.

The condenser 39 may be made with a water jacket 41 with which suitable circulation pipes 42—43 communicate and it may also be provided with a cooling coil 44. The condenser may also be provided with a safety valve 45 to permit the escape of vapors in case condensation should, for any reason, be too slow.

The condensed vapors will consist of the original solvent employed in the washing machine for removing the oily ink from the cloths and will be run through a pipe 46 (having a valve 47) into the storage tank 12, from which it can be pumped to the washing machine as before explained.

By our process, the ink-ladened cloths are entirely freed from the ink without any deteriorating effect on the fibers of the cloths; the constituents of the ink are separated from each other and said constituents as well as the solvent employed are separately recovered, the solvent in condition to be again used as such, and the pigment and oil in condition to be sold separately in the open market.

Having fully described our invention what we claim as new and desire to secure by Letters-Patent, is:—

1. The process consisting in treating material containing oily pigment with a solvent, separating said material from the liquor, treating the liquor to recover all the pigment freed from oil, and removing the solvent from the oil, thereby recovering the pigment, oil and solvent separately.

2. The herein described process, consisting in subjecting material containing oily pigment to the action of a solvent to remove said oily pigment, treating the resultant liquor chemically to form a precipitate containing pigment; mechanically separating the pigment from the liquor; separating the solvent from the fluid, and recovering the resultant oil.

3. The herein described process, consisting in treating material containing oily pigment with a volatile solvent; treating the resultant liquor to destroy its viscous character and form a precipitate capable of mechanical separation from the liquor, then mechanically separating the precipitate from the liquor, and then separating the solvent from the oil left in the liquor, and recovering said solvent and oil separately.

4. The herein described process, consisting in treating material containing oily pigment with a volatile solvent, mixing with the resultant liquor a chemical reagent capable of solution or emulsion with the volatile solvent, then treating said liquor chemically to form a precipitate, then mechanically separating said precipitate and pigment from the liquor, and treating the resulting fluid for the recovery of the solvent and oil separately.

5. The herein described process consisting in treating material containing oily pigment with a solvent to remove said oily pigment, agitating the resultant liquor and simultaneously adding thereto a chemical reagent capable of solution or emulsion in the solvent, then adding a chemical to form a precipitate with said reagent and which will carry the pigment.

6. The herein described process consisting in treating material containing oily pigment, with a solvent to remove the oily pigment, adding to the resultant liquor alcoholic solution of calcium chlorid, subjecting the liquor to agitation; adding during agitation, a chemically equivalent quantity of alcoholic solution of sulfuric acid, mechanically separating the precipitate to recover the pigment, and separating the solvent from oil and recovering both.

7. The herein described process consisting in washing cloths containing oily ink in a volatile solvent, treating the resultant liquor chemically to form a precipitate containing the pigment, mechanically separating the pigment from the liquor, and separating the solvent from the remaining fluid to recover the oil and solvent separately.

8. The herein described process consisting in washing material containing oily ink, in a volatile solvent, treating the liquor chemically to form a precipitate containing pigment, mechanically separating the precipitated pigment from the liquor, distilling the resultant fluid to drive off the volatile solvent and recover the oil, and condensing the volatilized solvent and recovering the same.

In testimony whereof, we have signed this specification in the presence of two subscribing witnesses.

MATTHEW S. HOPKINS.
CHARLES RIDGELY BARNETT.

Witnesses:
  LEWIS N. HOPKINS, Jr.,
  JOSEPH T. BYRNE.